(12) United States Patent
Hwang et al.

(10) Patent No.: US 10,990,177 B2
(45) Date of Patent: Apr. 27, 2021

(54) TACTILE TRANSMISSION DEVICE AND USER INTERFACE SYSTEM INCLUDING THE SAME

(71) Applicants: KOREA INSTITUTE OF SCIENCE AND TECHNOLOGY, Seoul (KR); CENTER OF HUMAN-CENTERED INTERACTION FOR COEXISTENCE, Seoul (KR)

(72) Inventors: Donghyun Hwang, Seoul (KR); Keehoon Kim, Seoul (KR); Byeongkyu Lim, Seoul (KR); Bum-Jae You, Seoul (KR)

(73) Assignees: Korea Institute of Science and Technology, Seoul (KR); Center of Human-Centered Interaction For Coexistence, Seoul (KR)

( * ) Notice: Subject to any disclaimer, the term of this patent is extended or adjusted under 35 U.S.C. 154(b) by 93 days.

(21) Appl. No.: 16/199,708

(22) Filed: Nov. 26, 2018

(65) Prior Publication Data
US 2019/0171290 A1 Jun. 6, 2019

(30) Foreign Application Priority Data
Dec. 4, 2017 (KR) .......................... 10-2017-0164960

(51) Int. Cl.
*G06F 3/01* (2006.01)

(52) U.S. Cl.
CPC .............. *G06F 3/016* (2013.01); *G06F 3/014* (2013.01)

(58) Field of Classification Search
CPC .................................. G06F 3/016; G06F 3/014
See application file for complete search history.

(56) References Cited

U.S. PATENT DOCUMENTS

| 8,830,335 | B2 | 9/2014 | Topliss et al. |
| 2018/0136729 | A1* | 5/2018 | Kim ........................ G06F 3/016 |

FOREIGN PATENT DOCUMENTS

| EP | 2 375 272 A2 | 10/2011 | |
| JP | 2011-209467 A | 10/2011 | |
| JP | 2013-537660 A | 10/2013 | |
| KR | 10-2014-0131175 A | 11/2014 | |
| KR | 10-1658513 B1 | 9/2016 | |
| WO | WO 2016/171335 | * 10/2016 | ............. G06F 3/016 |

OTHER PUBLICATIONS

Robert Scheibe et al., "Tactile Feedback at the Finger Tips for Improved Direct Interaction in Immersive Environments", IEEE Symposium on 3D User Interfaces 2007, pp. 123-130.

(Continued)

*Primary Examiner* — Abdul-Samad A Adediran
(74) *Attorney, Agent, or Firm* — Rabin & Berdo, P.C.

(57) ABSTRACT

Provided is a tactile transmission device, which includes a base unit forming one surface of the tactile transmission device, a tip-tilt elastic member stacked on the base unit and configured to transmit a tactile feel to a finger of a user in a first direction oriented upward from a bottom surface of the finger and a second direction intersecting the first direction at a predetermined angle, and a cover disposed at an upper side of the tip-tilt elastic member to form another surface of the tactile transmission device.

12 Claims, 12 Drawing Sheets

(56) References Cited

OTHER PUBLICATIONS

Domencio Prattichizzo et al., "Towards Wearability in Fingertip Haptics: A 3-DoF Wearable Device for Cutaneous Force Feedback", IEEE Transactions on Haptics, 2013, pp. 506-516, vol. 6, No. 4.
Gabriele Frediani et al., "Wearable wireless tactile display for virtual interactions with soft bodies", Frontiers in Bioengineering and Biotechnology, 2014, vol. 2, Article 31.

* cited by examiner

Pressure

Pressure

TACTILE TRANSMISSION DEVICE AND USER INTERFACE SYSTEM INCLUDING THE SAME

CROSS-REFERENCE TO RELATED APPLICATION

This application claims priority to Korean Patent Application No. 10-2017-0164960, filed on Dec. 4, 2017, and all the benefits accruing therefrom under 35 U.S.C. § 119, the contents of which in its entirety are herein incorporated by reference.

STATEMENT REGARDING SPONSORED RESEARCH

This study was supported by the global frontier project of the National Research Foundation of Korea, the Ministry of Science and ICT (Development of EMG signal-based motion prediction and wearable touch display technology for sensory-motor work, Project No. 1711053653) under the sponsorship of Korea Institute of Science and Technology.

BACKGROUND

1. Field

The present disclosure relates to a tactile transmission device and a user interface system including the same, and more particularly, to a wearable tactile transmission device capable of transmitting a multi-degree of freedom force-feedback and a user interface system including the same.

2. Description of the Related Art

Along with the industrial development, a user interface system for operating slave robots or virtual graphics (hereinafter, referred to as an "avatar") according to the will of a user in a virtual environment, an augmented environment or a remote environment has been developed variously.

The human fingers are sensitive to tactile feel and capable of making precise motions, so the fingers are often used as a means to operate the interface system as above.

In the interface system, a user is not able to directly experience the avatar to be controlled and the environment in which the avatar moves, and thus a device for providing tactile feedback to the user for more realistic and sophisticated control has been designed.

A conventional tactile transmission device generally transmits an output of a driving unit (or, an actuator) such as a motor to a link and forms a tactile feel on the finger in such a way that a force is applied to a terminal portion worn on the finger through the link.

However, in the conventional tactile transmission device, as disclosed in Korean Unexamined Patent Publication No. 10-2014-0131175, the driving unit is located on the back of the hand or the wrist, and the output of the driving unit is transmitted to the finger, thereby often configuring an exoskeleton form encompassing the wrist and hand.

According to the conventional structure, it is not easy to wear and take off the driving unit, resulting in bad wearability and mobility of the user. In addition, since the device is complicated and relatively large in volume and weight, the usability and portability of the device are greatly degraded. Moreover, since the types of expressible tactile feel are limited, there is a limit in configuring a realistic interface system.

Meanwhile, some conventional techniques have a high risk and small output displacement and force since they use a high voltage. Also, there is a difficulty in providing a multi-degree of freedom force-feedback.

SUMMARY

The present disclosure is designed to solve the above problem, and the present disclosure is directed to providing a device that may transmit the sense of gripping or manipulating a remote target in a virtual and augmented reality to a user.

Also, the present disclosure is directed to providing a device capable of providing a multi-degree of freedom force-feedback.

In one aspect, there is provided a tactile transmission device, comprising: a base unit forming one surface of the tactile transmission device; a tip-tilt elastic member stacked on the base unit and configured to transmit a tactile feel to a finger of a user in a first direction oriented upward from a bottom surface of the finger and a second direction intersecting the first direction at a predetermined angle; and a cover disposed at an upper side of the tip-tilt elastic member to form another surface of the tactile transmission device, wherein the tip-tilt elastic member includes: a load support unit provided at a center portion of the tip-tilt elastic member and configured to support a load of the finger; and a pressing unit provided at an edge portion of the tip-tilt elastic member and configured to press in the first direction, wherein a first wire-type actuator is installed at the pressing unit, and when being elastically deformed, the first wire-type actuator presses the pressing unit to elastically deform the tip-tilt elastic member so that the tactile feel is transmitted to the finger in the first and second directions.

According to an embodiment of the present disclosure, the tactile transmission device may further comprise a surface elastic member stacked on the tip-tilt elastic member and configured to transmit the tactile feel in a third direction along which a shearing stress is transmitted to the finger.

The surface elastic member may include: a fixed portion provided at a side surface of the surface elastic member and fixed to the tip-tilt elastic member; a movable portion configured to be movable in the third direction relative to the fixed portion; and a laterally elastic portion disposed between the fixed portion and the movable portion and elastically deformed to allow the movable portion to move in the third direction relative to the fixed portion.

The surface elastic member may further include a second wire-type actuator installed between the fixed portion and the movable portion and elastically deformed to change a relative position of the movable portion with respect to the fixed portion, so that the tactile feel is transmitted to the finger in the third direction.

The laterally elastic portion may be provided in plural and be made of an elastic body disposed between a point contacting the fixed portion and a point contacting the movable portion.

The laterally elastic portion may have a point-symmetric shape based on one point at the center of the movable portion.

The tactile transmission device according to the present disclosure may further comprise a contact portion disposed at an upper side of the surface elastic member to contact the finger of the user and transmit the tactile feel to the user.

According to another embodiment of the present disclosure, guide pillars extending upward may be formed at four corners of the base unit, and the guide pillars may have first guide grooves formed in a longitudinal direction to accommodate the first wire-type actuator.

The cover may have a coupling hole formed so that an end portion of the first wire-type actuator is fixedly coupled therein, and the cover may have a second guide groove formed at an upper surface thereof to respectively communicate with the first guide groove and the coupling hole along an edge of the cover so that the first wire-type actuator is accommodated therein.

According to another embodiment of the present disclosure, the tip-tilt elastic member may further include an elastic unit provided between the load support unit and the pressing unit to be elastically deformable, the elastic unit being configured to transmit the tactile feel to the finger in the first and second directions in a state where the pressing unit receives an upward force.

The load support unit may include a support protrusion protruding downward, the pressing unit may include a pressing protrusion protruding downward and having a curved lower end, and the base unit may include a pressing accommodation portion for accommodating and supporting the support protrusion and an inclined support portion having an inclined surface that contacts the pressing protrusion.

The pressing unit may be respectively provided at four sides of the tip-tilt elastic member so that a force is transmittable to the pressing units at four sides in the first direction, and when the force is transmitted to at least one of the pressing units at four sides, the force transmitted to the finger may be determined to be transmitted in the first direction or the second direction.

In another aspect of the present disclosure, there is also provided a user interface system for moving an avatar to correspond to a motion of a finger, comprising: a tactile transmission device according to the present disclosure; a computer connected to the tactile transmission device in a wired or wireless manner and configured to associate the avatar with the motion of the finger; and a control unit configured to control the tactile transmission device to contact the finger of the user and transmit a tactile feel when a predetermined contact occurs at the avatar.

DETAILED DESCRIPTION

Hereinafter, the embodiments disclosed in this specification will be described in detail. Here, identical or similar components are denoted by identical or similar reference symbols and not described in detail again. In the following description, the word "unit" used in terms is selected or endowed only in consideration of ease naming and does not have any distinguishable meaning or role. In addition, in the following description of the embodiments of the present disclosure, any detailed description of related arts can be omitted if it is determined that the gist of the embodiments disclosed herein can be obscured by the same. Moreover, it should be understood that the accompanying drawings are just for better understanding of the embodiments disclosed herein and are not to be construed as limiting the scope of the present disclosure. The scope of the present disclosure should be understood as including all changes, equivalents and alternatives thereof.

Terms having an ordinal such as "first" and "second" can be used for explaining various components, but the components are not limited by the terms. These terms are just used for distinguishing any component from another.

In case it is mentioned that any component is "connected" to another component, the component may be connected directly to another component, but it should be understood that any other component can be further interposed between them.

The singular expressions are intended to include the plural forms as well, unless the context clearly indicates otherwise.

In this specification, the term such as "include" and "have" is just to specify the presence of features, integers, steps, operations, elements, parts or components thereof, stated in the specification, but does not preclude the presence or addition of one or more other features, integers, steps, operations, elements, parts or components thereof.

Figure 1:
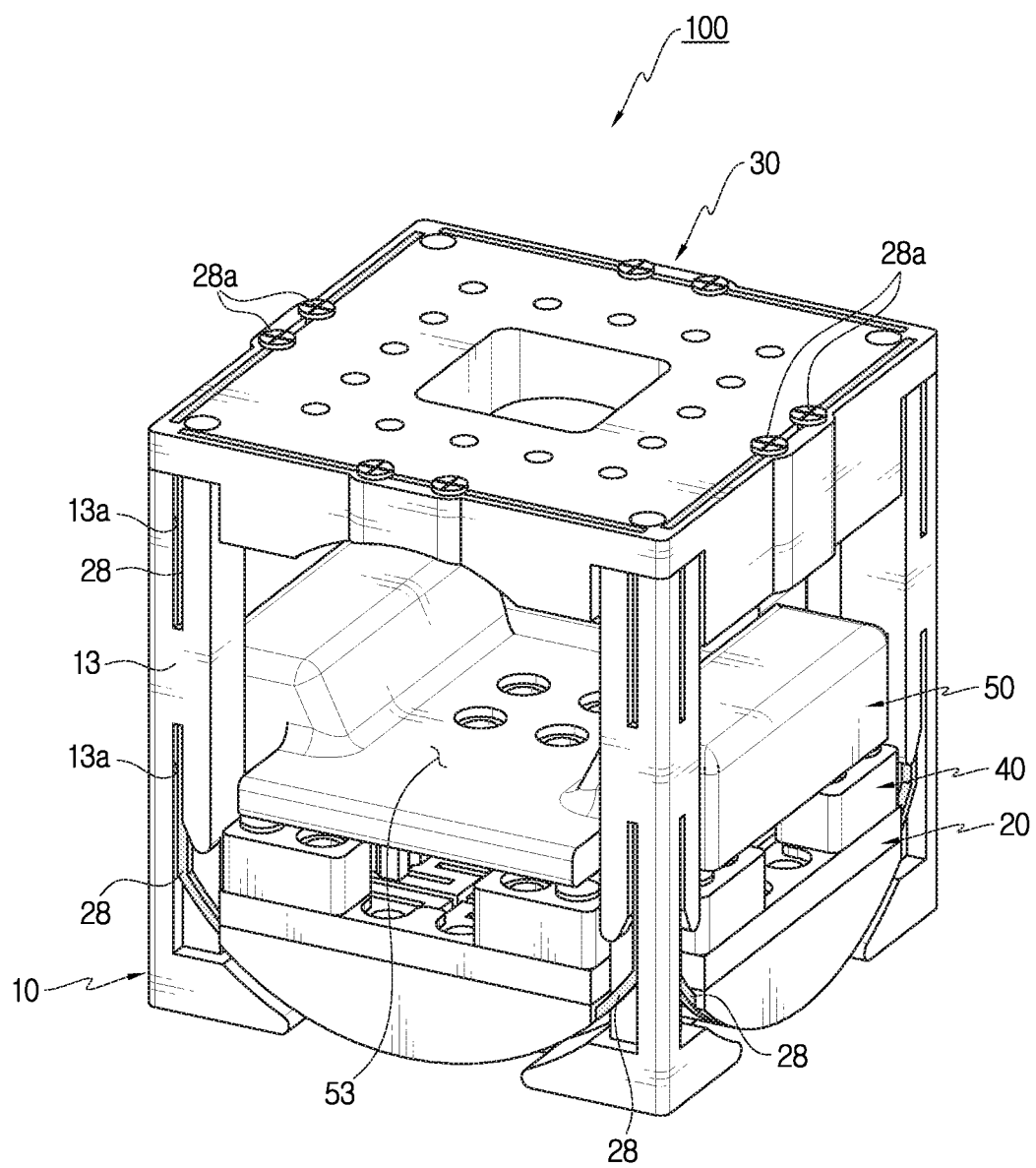
FIG. 1 is a perspective view showing an example of a tactile transmission device of the present disclosure.
Figure 2:
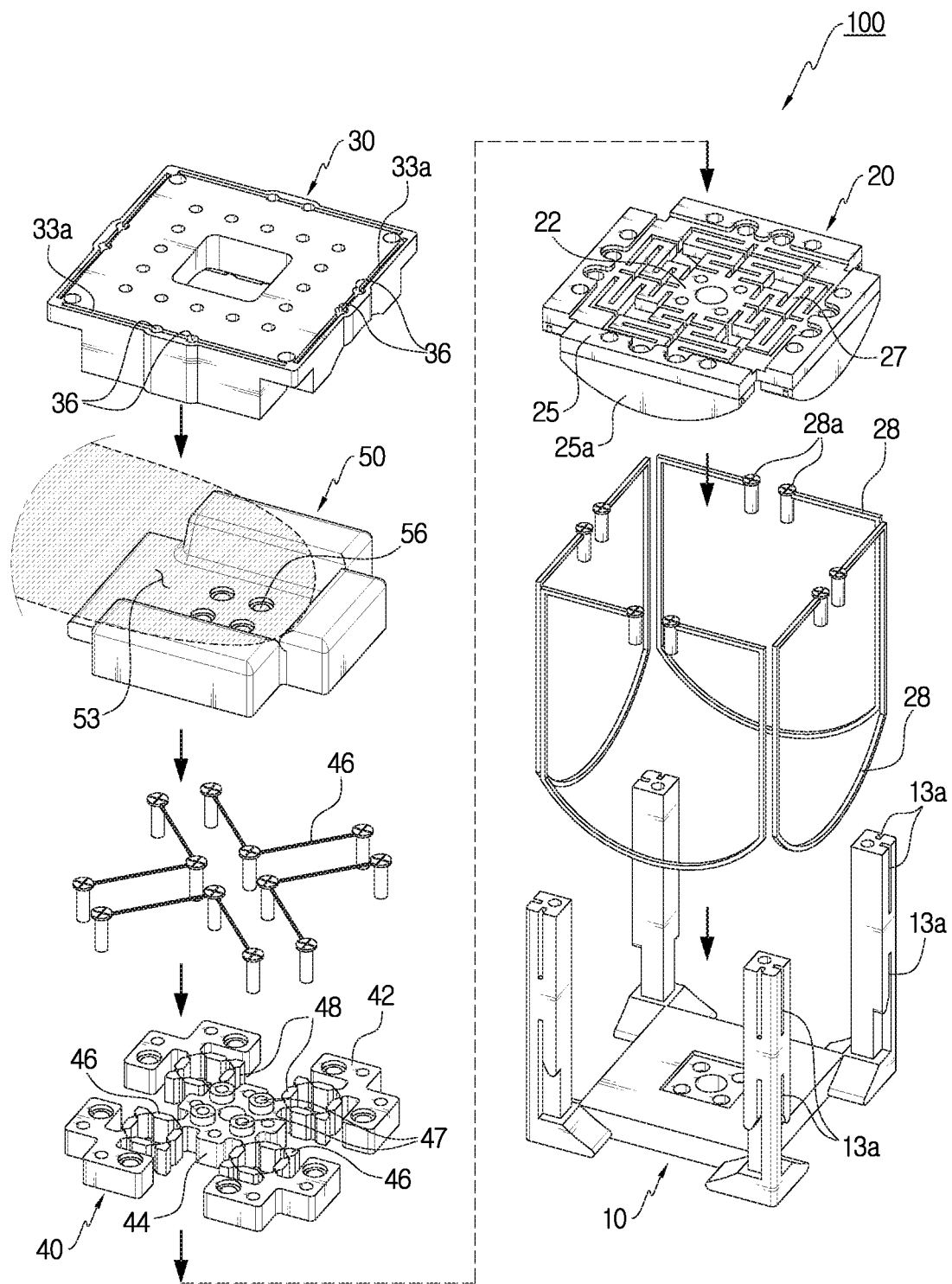
FIG. 2 is an exploded perspective view of FIG. 1.
Figure 3A:
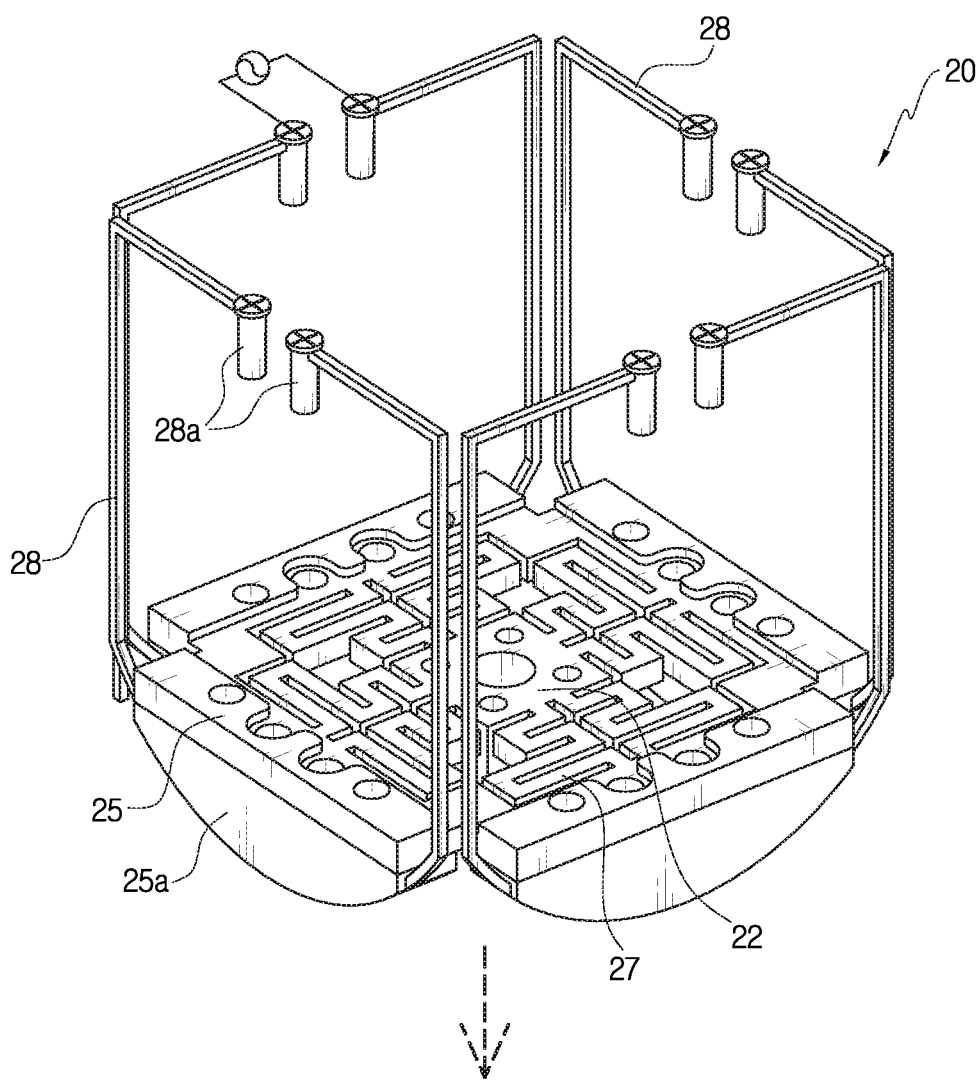
FIG. 3A is a perspective view showing a tip-tilt elastic member from the above.
Figure 3A:
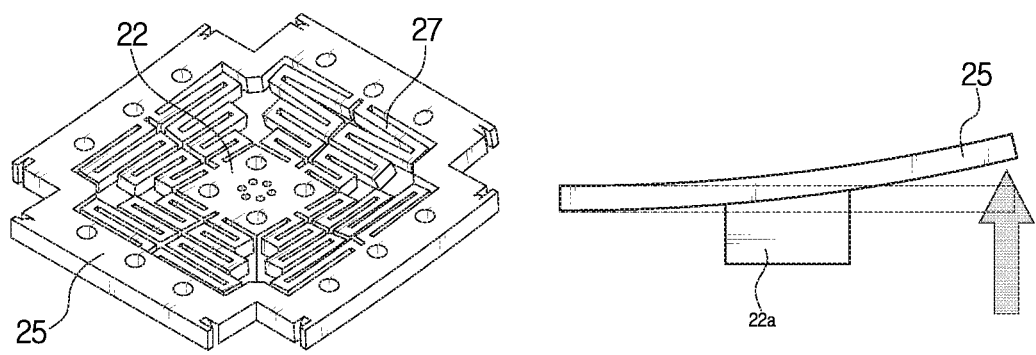
Figure 3B:
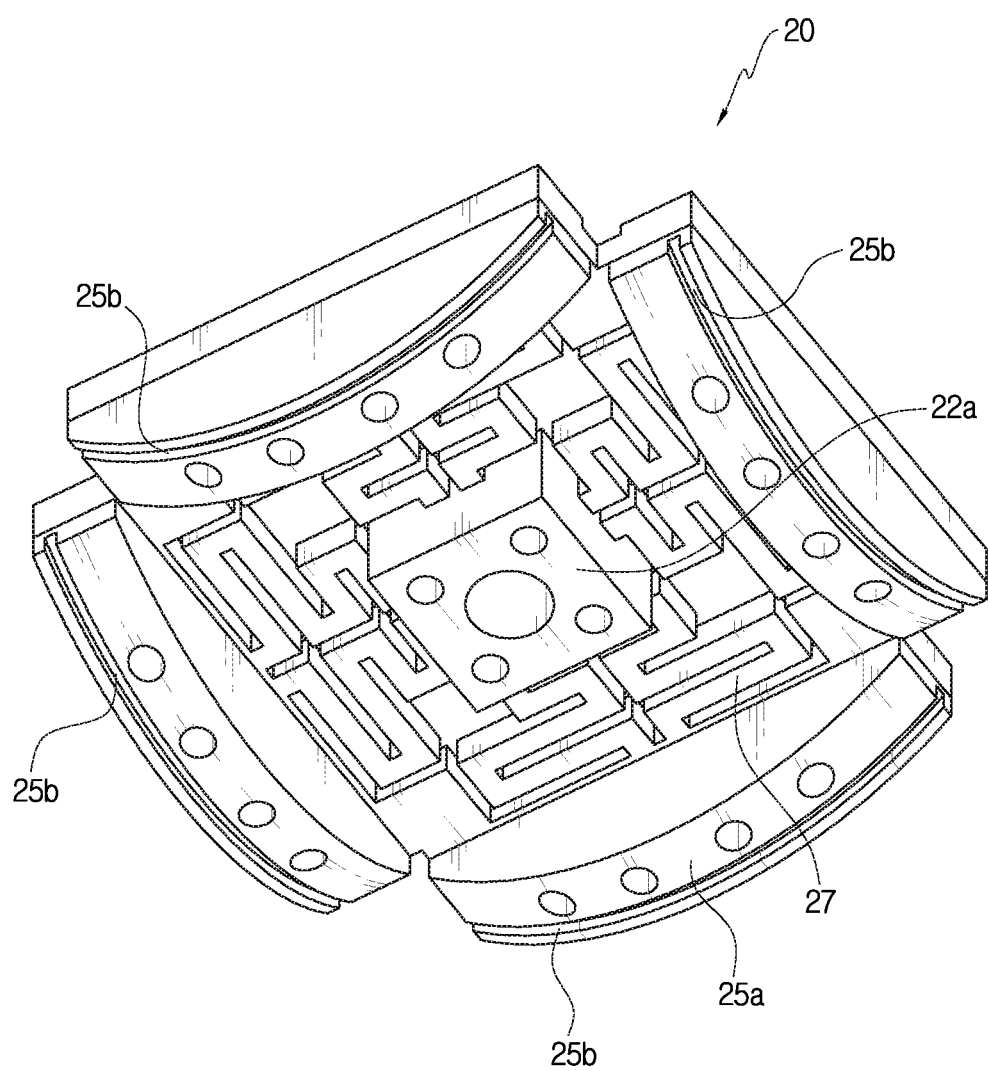
FIG. 3B is a perspective view showing the tip-tilt elastic member from the below.
Figure 4A:
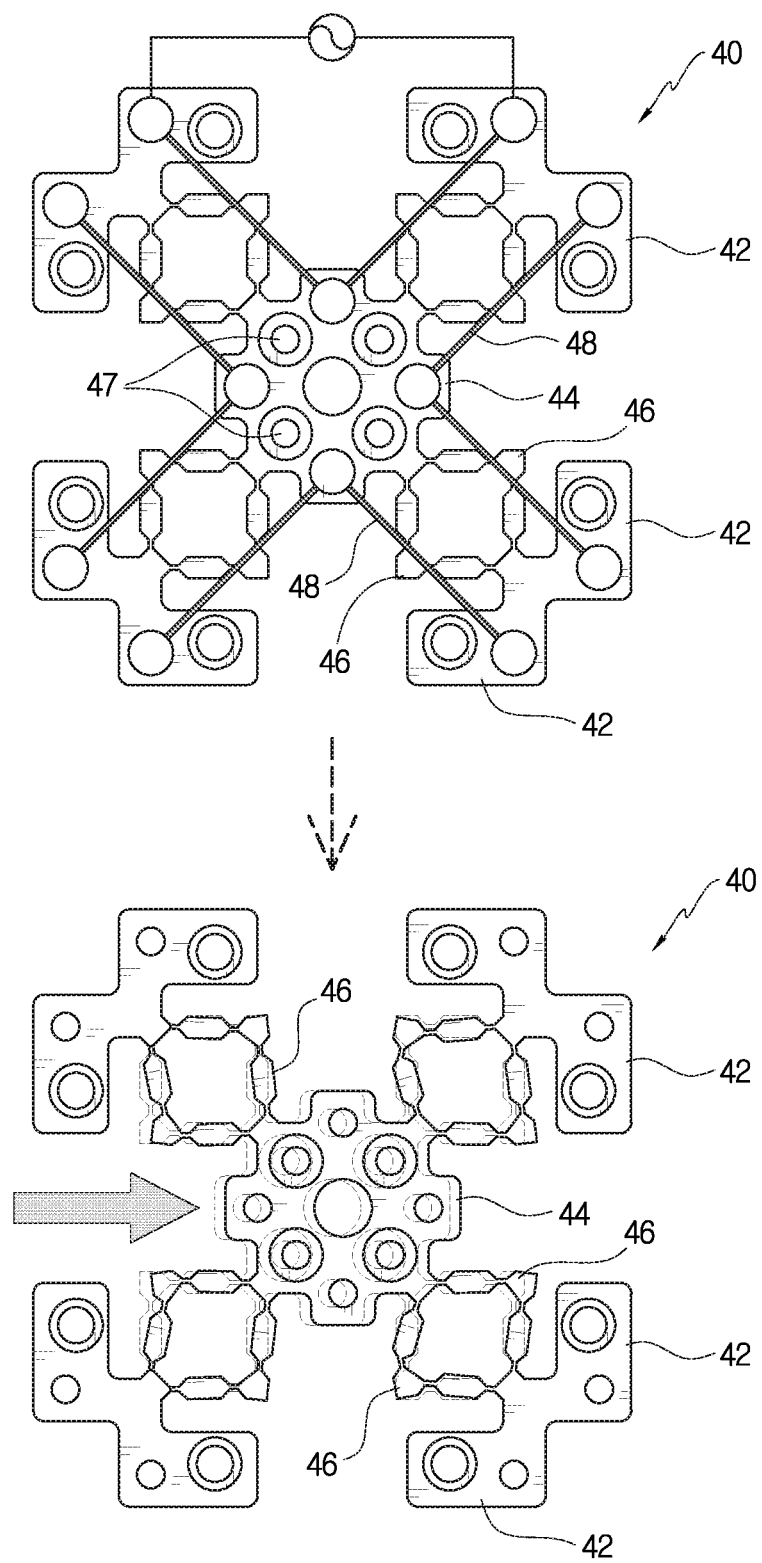
FIG. 4A is a perspective view showing a surface elastic member from the above.
Figure 4B:
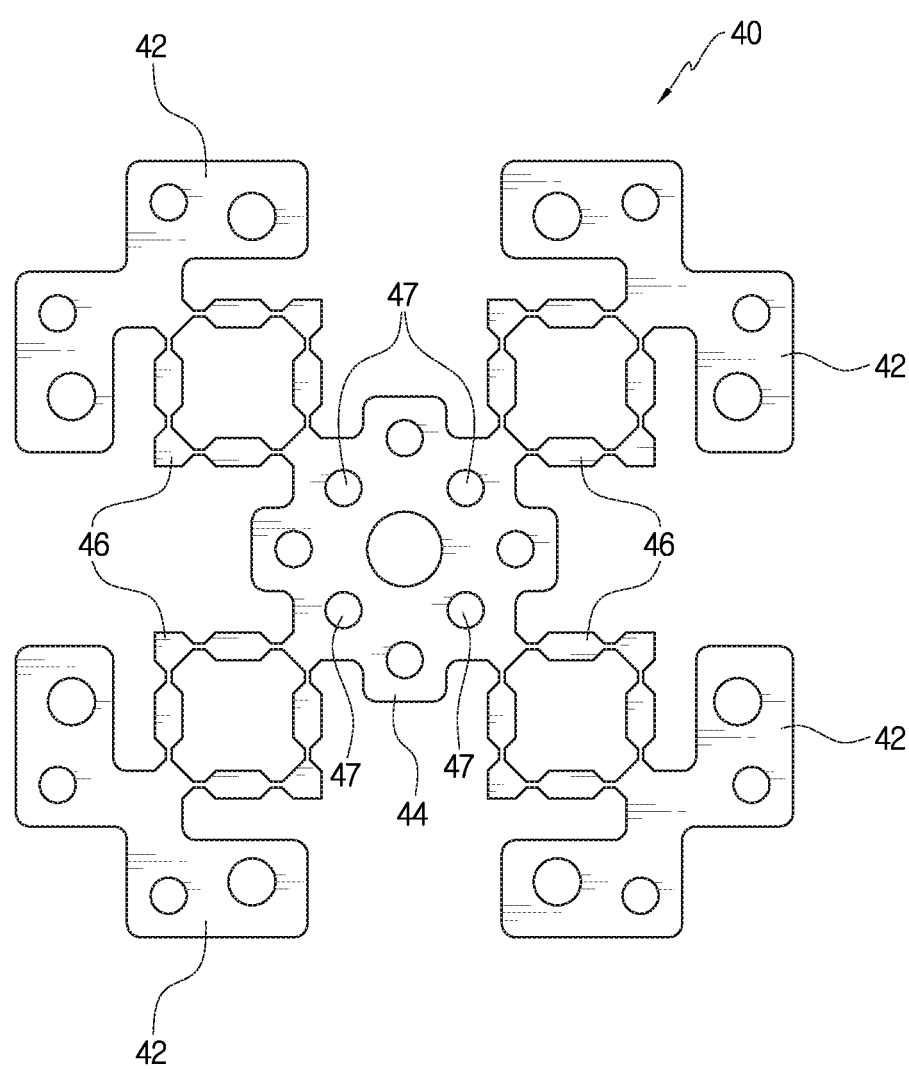
FIG. 4B is a bottom view showing the surface elastic member from the below.

FIG. 1 is a perspective view showing an example of a tactile transmission device 100 of the present disclosure, and FIG. 2 is an exploded perspective view of FIG. 1. Also, FIG. 3A is a perspective view showing a tip-tilt elastic member 20 from the above, and FIG. 3B is a perspective view showing the tip-tilt elastic member 20 from the below. FIG. 4A is a perspective view showing a surface elastic member 40 from the above, and FIG. 4B is a bottom view showing the surface elastic member 40 from the below.

Hereinafter, the structure of the tactile transmission device 100 of the present disclosure will be described with reference to FIGS. 1 to 4B.

The tactile transmission device 100 of the present disclosure includes a base unit 10, a tip-tilt elastic member 20, and a cover 30.

The base unit 10 forms one surface of the tactile transmission device 100. The tip-tilt elastic member 20, a surface elastic member 40 and a contact portion 50, explained later, may be stacked on the base unit 10. A guide pillar 13 is formed at the base unit 10, and this will be described later.

The tip-tilt elastic member 20 is disposed to be stacked on the base unit 10 and transmits a tactile feel to a lower portion of the finger of a user in first and second directions.

Figure 5A:
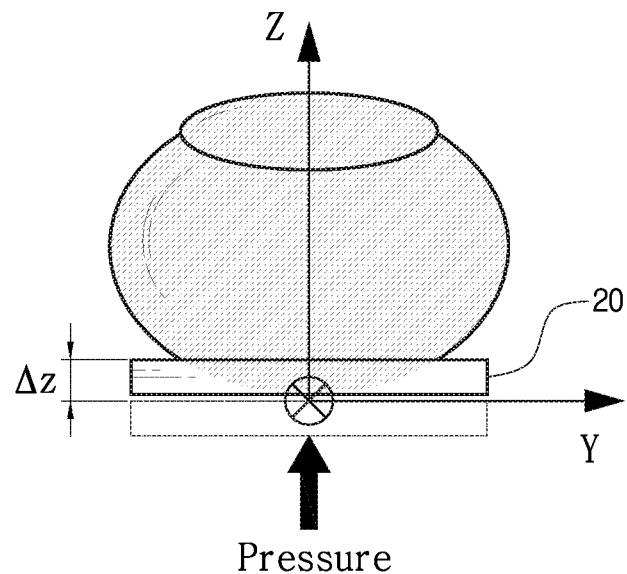
FIG. 5A is a diagram conceptually showing an example that a tactile feel is transmitted in a first direction by the tip-tilt elastic member.

In the present disclosure, the first direction is a direction oriented upward from a bottom surface of the finger of the user, and, for example, the first direction may be a vertical direction oriented upward from the bottom surface of the finger of the user (a Z direction indicated by an arrow in FIG. 5A). In addition, the second direction is a direction intersecting the first direction at a predetermined angle, and for example, the second direction may be a direction intersecting a vertical direction and a lateral direction (a θx direction indicated by an arrow in FIG. 5B) to the bottom surface of the finger or a front and rear direction (a θy direction indicated by an arrow in FIG. 5C) at a predetermined angle.

The cover 30 is disposed at an upper side of the tip-tilt elastic member 20 and forms another surface opposite to one surface of the base unit 10.

Referring to FIGS. 3A and 3B, the tip-tilt elastic member 20 includes a load support unit 22 and a pressing unit 25.

The load support unit 22 is provided at a center portion of the tip-tilt elastic member 20 and supports a load of the finger of the user.

The pressing unit 25 is provided at an edge portion of the tip-tilt elastic member 20 and is configured to be pressed in the first direction.

A first wire-type actuator 28 is installed at the pressing unit 25. The first wire-type actuator 28 presses the pressing unit 25 by elastic deformation. By doing so, the tip-tilt elastic member 20 is deformed, and the tactile feel may be transmitted to the finger of the user in the first and second directions.

In the present disclosure, the first and second wire-type actuators 28, 48 are solid-state actuators made of a wire, respectively. The solid-state actuator is an actuator that generates a mechanical energy such as force and displacement by deforming solid-state material if energy (electricity, heat, or the like) is applied from the outside. For example, the solid-state material may be deformed by applying (+) and (−) voltages to both end portions of first wire-type actuator 28.

For example, a shape memory alloy (SMA), a shape memory polymer and a dielectric elastomer may be used as the wire-type actuator according to this embodiment.

In the present disclosure, the first and second wire-type actuators 28, 48 are wires made of SMA material and are configured to actively vary in length when energy is applied thereto.

The first wire-type actuator 28 applies a force to the pressing unit 25 when being elastically deformed, and accordingly the tip-tilt elastic member 20 is elastically deformed to transmit the tactile feel to the finger of the user in first and second directions. This will be explained later in more detail.

In addition, as the second wire-type actuator 48 is elastically deformed, the surface elastic member 40 is elastically deformed so that the fixed portion 42 is elastically deformed in the third direction to transmit the tactile feel to the finger of the user. This will be explained later in more detail.

The tip-tilt elastic member 20 may further include an elastic unit 27 provided between the load support unit 22 and the pressing unit 25 to be elastically deformable. When the pressing unit 25 receives a force in the upper direction due to the length deformation of the first wire-type actuator 28, the elastic unit 27 is elastically deformed to transmit the tactile feel to the finger of the user in first and second directions.

Referring to FIGS. 3A and 3B, an example where the elastic unit 27 is provided at four portions between the load support unit 22 and the pressing unit 25 is shown. The elastic unit 27 is formed to have several curves, and the elastic units 27 at four portions are symmetrical to each other based on a line extending from a portion of the load support unit 22 to a portion of the pressing unit 25.

By doing so, if the pressing unit 25 receives a force in the upper direction, the elastic unit 27 is elastically deformed so that the tactile feel is easily transmitted to the finger of the user in first and second directions.

Referring to FIG. 3B, the load support unit 22 has a support protrusion 22a protruding downward, and the pressing unit 25 has a pressing protrusion 25a protruding downward. The lower end of the pressing protrusion 25a is preferably formed as a curved surface.

In correspondence with the shape of the support protrusion 22a and the pressing protrusion 25a of the tip-tilt elastic member 20, the base unit 10 includes a pressing accommodation portion 12 for accommodating and supporting the support protrusion 22a and an inclined portion 15 spaced apart from the pressing protrusion 25a by a predetermined distance, as shown in FIG. 2.

Meanwhile, a pressing groove 25b may be formed at the bottom surface of the pressing unit 25, and the first wire-type actuator 28 may be installed at the pressing groove 25b. The pressing groove 25b is formed along an extending direction at the bottom surface of the pressing unit 25 and may extend to a side surface. The pressing unit 25 may be provided at four sides of the tip-tilt elastic member 20, respectively. Referring to FIG. 3B, the pressing grooves 25b are respectively formed at four portions of the pressing unit 25 so that the pressing unit 25 may receive a force in the upper direction by the first wire-type actuator 28.

In addition, since the first wire-type actuator 28 is installed at each of the pressing units 25 at four sides, forces may be transmitted to the pressing units 25 at four sides in the first direction. As the force is transmitted to at least one of the pressing units 25 at four sides, the force transmitted to the finger is determined as being in the first direction or the second direction.

Figure 5B:
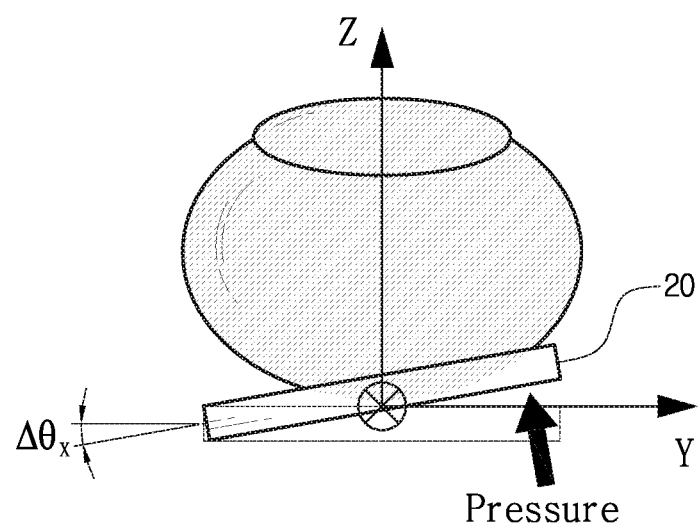
FIG. 5B is a diagram conceptually showing an example that a tactile feel is transmitted in a direction intersecting the first direction to the right by the tip-tilt elastic member.
Figure 5C:
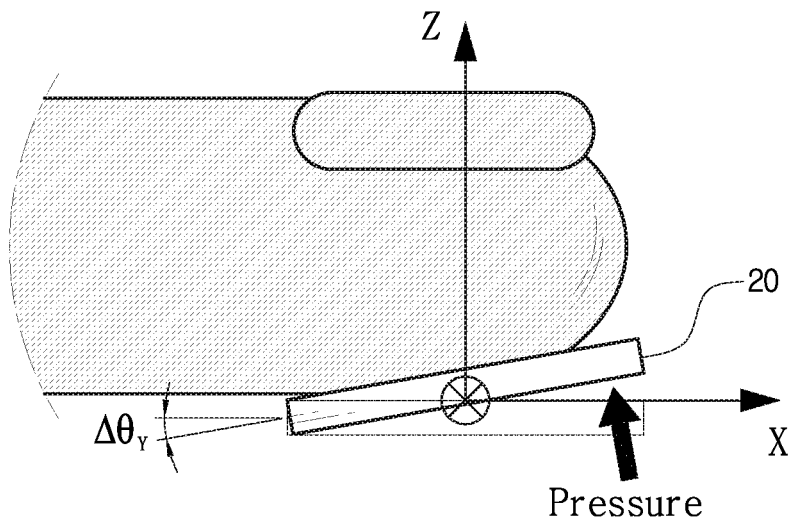
FIG. 5C is a diagram conceptually showing an example that a tactile feel is transmitted in a direction intersecting the first direction to the front by the tip-tilt elastic member.

FIG. 5A is a diagram conceptually showing an example that a tactile feel is transmitted in a first direction by the tip-tilt elastic member 20, FIG. 5B is a diagram conceptually showing an example that a tactile feel is transmitted in a direction intersecting the first direction to the right by the tip-tilt elastic member 20, and FIG. 5C is a diagram conceptually showing an example that a tactile feel is transmitted in a direction intersecting the first direction to the front by the tip-tilt elastic member 20.

An example where the tactile feel is transmitted in first and second directions will be described with reference to FIGS. 5A to 5C.

For example, if forces are transmitted to all of the pressing units 25 at four sides in the upper direction and the forces are all equal, the elastic units 27 adjacent to the pressing units 25 at four sides are all elastically deformed equally, and thus the finger of the user receives a force in the first direction. For example, a force in the vertical direction indicated by an arrow in FIG. 5A is transmitted to the finger.

Meanwhile, if an upward force is transmitted to the pressing unit 25 at the right side, the elastic unit 27 adjacent to the right side as in FIG. 3A is deformed upward, and the finger of the user receives a force in a direction intersecting the first direction to the right. Referring to FIG. 5B, an example where the tactile feel is transmitted to the finger in a direction intersecting the first direction to the right is shown.

In addition, if an upward force is transmitted to the pressing unit 25 at the upper side, the elastic unit 27 adjacent to the upper side is deformed, and the finger of the user receives the force in a direction intersecting the first direction to the front. Referring to FIG. 5C, an example where the tactile feel is transmitted to the finger in a direction intersecting the first direction to the front is shown.

As described above, the tip-tilt elastic member 20 is able to transmit a tactile feel of three degrees of freedom by applying a force to a part of the pressing units 25 at four sides.

The tactile transmission device 100 may further include a surface elastic member 40. For example, the surface elastic member 40 is stacked on the tip-tilt elastic member 20. The surface elastic member 40 transmits the tactile feel to the finger in a third direction. In the present disclosure, the third direction is a direction parallel to the surface in contact with the bottom of the finger, and this may be understood as a two-dimensional direction in which the tactile feel is transmitted to the finger by means of a shearing force. That is, the third direction means a direction of the force that is provided by the shearing stress when the finger touches the surface.

The surface elastic member 40 may further include a fixed portion 42, a movable portion 44, and a laterally elastic portion 46.

The fixed portion 42 is provided at a side surface of the surface elastic member 40 and is fixed to the tip-tilt elastic member 20.

In addition, the movable portion 44 is movable in the third direction relative to the fixed portion 42.

The laterally elastic portion 46 is disposed between the fixed portion 42 and the movable portion 44 and is elastically deformed to allow the movable portion 44 to move relative to the fixed portion 42 in the third direction. For example, the laterally elastic portion 46 may be provided in plural, and may be elastic bodies disposed between a point contacting the fixed portion 42 and a point contacting the movable portion 44. The elastic body may be, for example, a compliant mechanism. In addition, the laterally elastic portion 46 may be disposed in a point-symmetric shape based on one point at the center of the movable portion 44.

FIGS. 4A and 4B show an example of the surface elastic member 40. The fixed portions 42 having a rectangular shape are provided at upper, lower, left and right side surfaces, and the movable portion 44 has a square shape and is spaced apart from the fixed portions 42. In addition, the laterally elastic portions 46 are provided at four regions between the movable portion 44 and the fixed portions 42 and are bent several times to be easily elastically deformed. The laterally elastic portions 46 have a point-symmetric shape based on one point at the center of the movable portion 44.

The surface elastic member 40 may further include a second wire-type actuator 48. The second wire-type actuator 48 is installed between the fixed portion 42 and the movable portion 44, and the second wire-type actuator 48 is elastically deformed to change a relative position of the movable portion 44 with respect to the fixed portion 42 to transmit the tactile feel to the finger in the third direction.

Referring to FIG. 4A, an example where the second wire-type actuators 48 are installed diagonally between the fixed portion 42 and the movable portion 44 is shown. An end portion of each second wire-type actuator 48 is fixed to the fixed portion 42 by a bolt and caught to the movable portion 44 by a pin. However, the present disclosure is not limited to this structure.

Figure 6A:
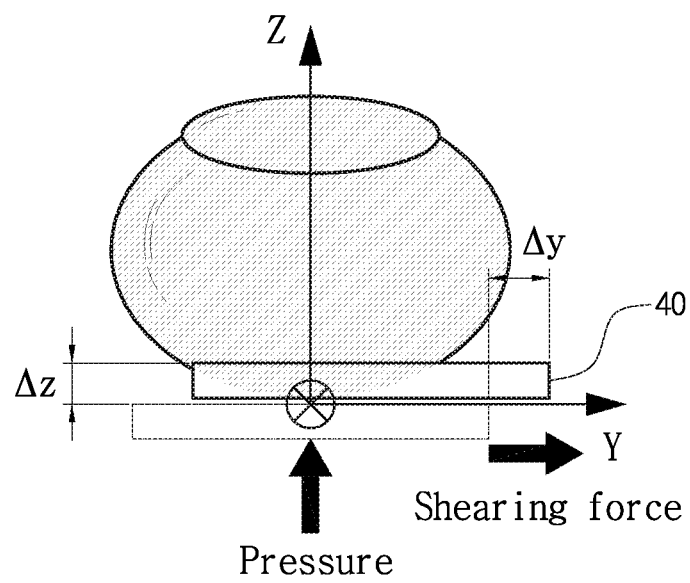
FIG. 6A is a diagram conceptually showing an example that a tactile feel by a shearing force is transmitted in a right direction by the surface elastic member.
Figure 6B:
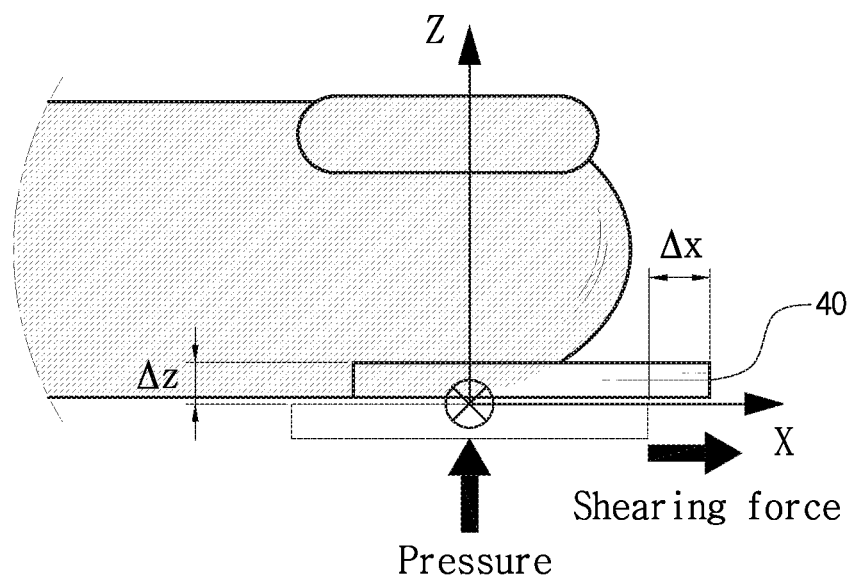
FIG. 6B is a diagram conceptually showing an example that a tactile feel by a shearing force is transmitted in a front direction by the surface elastic member.

Referring to FIG. 4A, an example where the movable portion is moved to the right is shown. Since the second wire-type actuators 48 at the upper right position and the lower right position are deformed together in FIG. 4A, the movable portion is deformed to the right. In addition, FIG. 6A shows an example where a shearing force acts to the right side of the finger (in the Y direction), and FIG. 6B shows an example where a shearing force acts to the front side of the finger (in the X direction).

As described above, the surface elastic member 40 may transmit a tactile feel of two degrees of freedom.

Meanwhile, the tactile transmission device 100 of the present disclosure further includes a contact portion 50 disposed at an upper side of the surface elastic member 40 to contact the finger and transmit a tactile feel to the user. A pressure sensor or a force sensor capable of checking contact with the finger may be disposed at the top end of the contact portion 50.

For example, as shown in FIGS. 1 and 2, a plurality of coupling holes 56 are formed in the contact portion 50, and coupling holes 47 corresponding to the coupling holes 56 of the contact portion 50 are formed in the surface elastic member 40, so that the contact portion 50 may be coupled to the upper portion of the surface elastic member 40. Though not explicitly shown in the figures, the contact portion 50 and the surface elastic member 40 may be coupled by bolts or pins. The contact portion 50 may have a finger accommodation portion 53 at an upper portion of the contact portion 50 so that the finger of the user is put therein.

A guide pillar 13 for guiding the side surfaces of the tip-tilt elastic member 20 and the surface elastic member 40 to facilitate assembling is formed at the base unit 10. FIGS. 1 and 2 show an example where the guide pillars 13 are formed to extend upward at four corners of the base unit 10, and the corner portions of the tip-tilt elastic member 20 and the surface elastic member 40 are respectively shaped corresponding to the guide pillars 13 so as to be guided by the guide pillars 13 during assembling. After assembling, the tip-tilt elastic member 20 and the surface elastic member 40 are supported by the guide pillars 13 to easily transmit the tactile feel to the finger of the user.

The cover 30 is coupled to an upper portion of the guide pillar 13. For example, though not explicitly shown in the figures, the cover 30 may be coupled to the upper portion of the guide pillar 13 by a bolt or the like.

A first guide groove 13a is formed in the guide pillar 13 along a longitudinal direction of the guide pillar 13. The first guide groove 13a may accommodate the first wire-type actuator 28.

In addition, the cover 30 may have a fixing hole 32 formed to be fixed to the guide pillar 13 and a coupling hole 36 to which the end portion of the first wire-type actuator 28 may be fixedly coupled. A second guide groove 33a is formed at the top surface of the cover 30 so that the second guide groove 33a communicates with the first guide groove 13a and the coupling hole 36 along the edge of the cover 30, respectively.

The first wire-type actuator 28 is mounted to the first guide groove 13a, the second guide groove 33a and the coupling hole 36, and the end portion of the first wire-type actuator 28 may be coupled to the coupling hole 36 by a bolt.

Figure 7A:
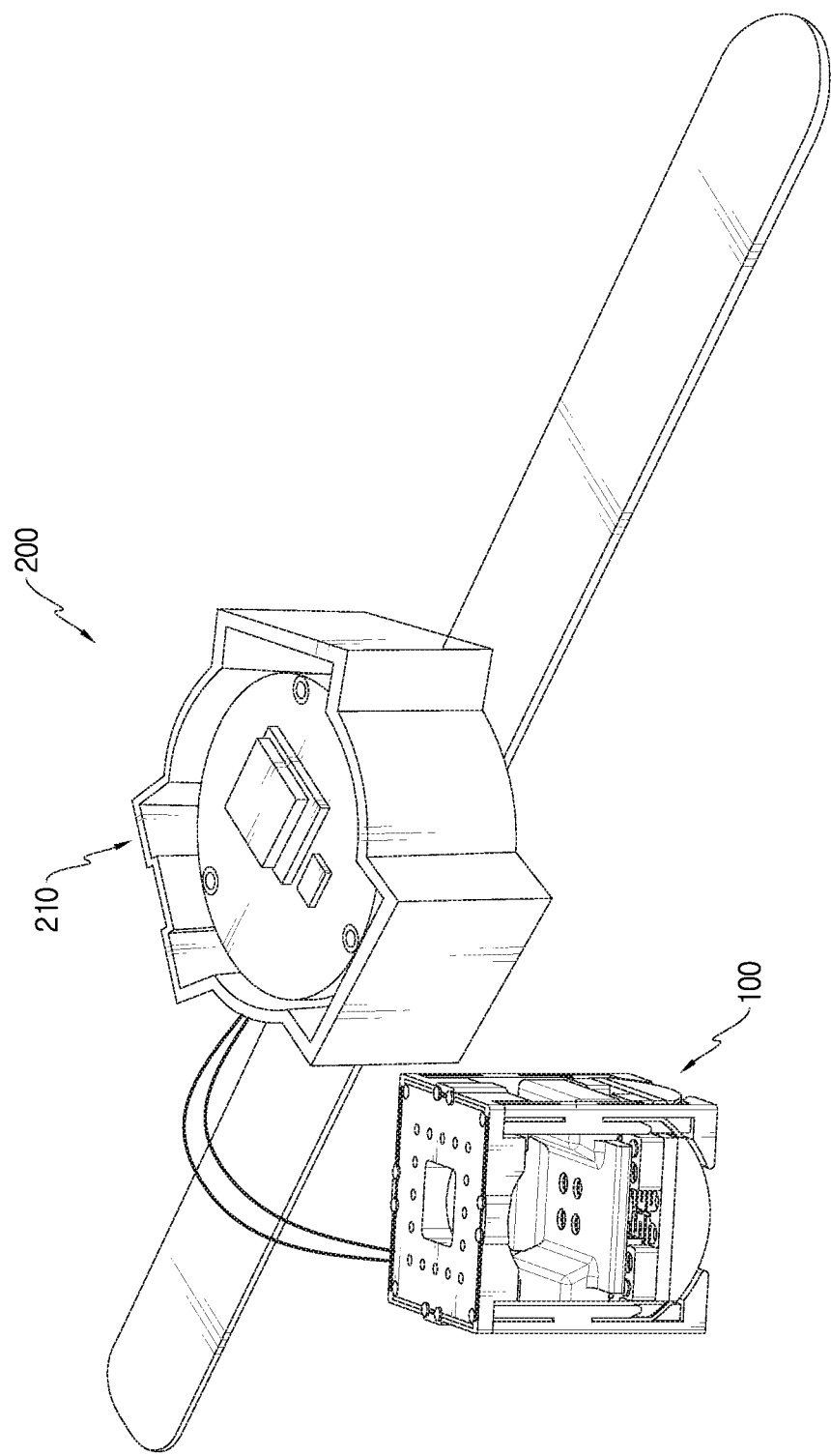
FIG. 7A is a perspective view showing a user interface system of the present disclosure.
Figure 7B:
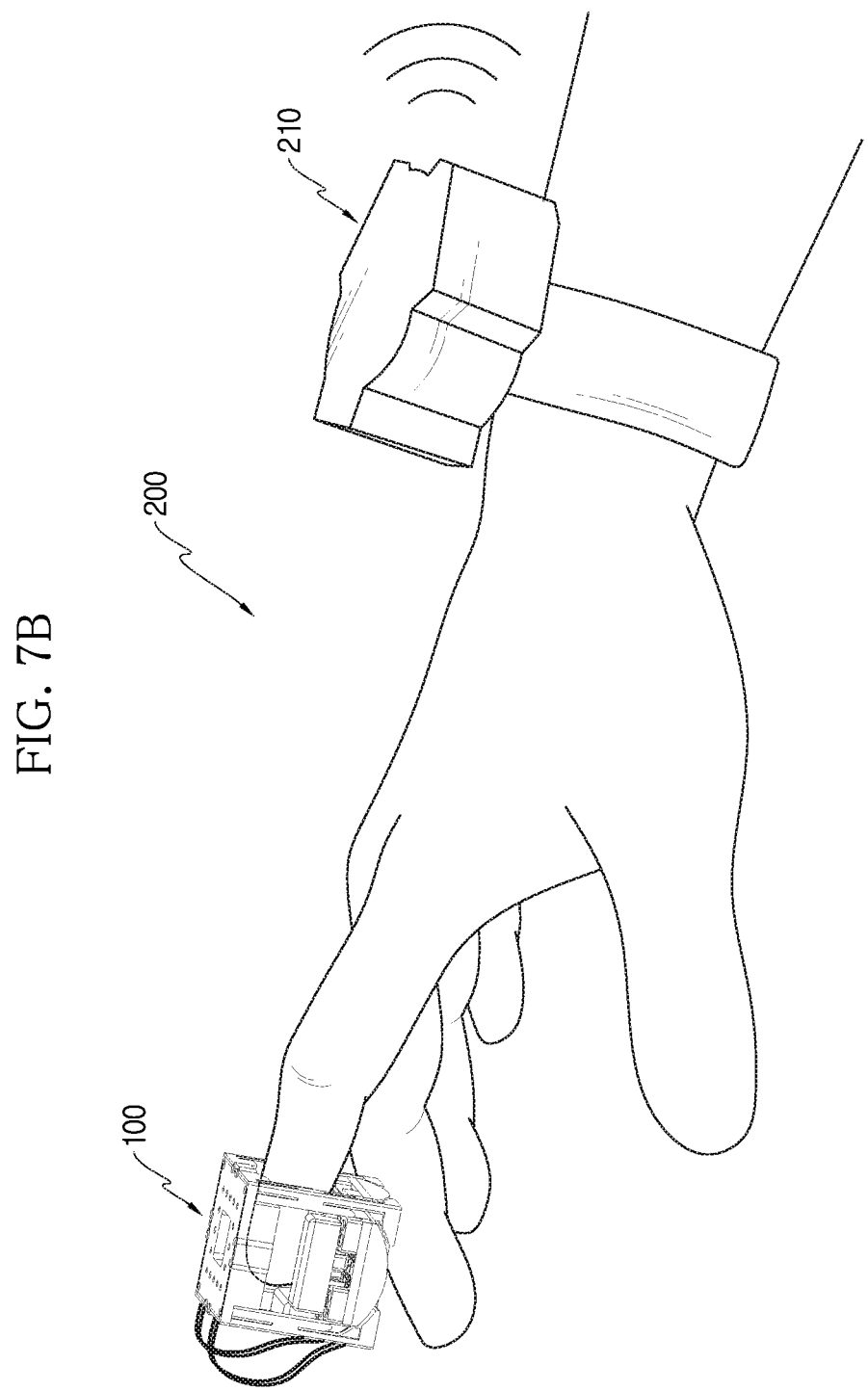
FIG. 7B is a diagram conceptually showing an example that the system of FIG. 7A is installed to a user.

FIG. 7A is a perspective view showing a user interface system 200 of the present disclosure, and FIG. 7B is a diagram conceptually showing an example that the system 200 of FIG. 7A is installed to a user.

The user interface system 200 of the present disclosure is configured to move an avatar in response to finger motion.

The user interface system 200 of the present disclosure includes the tactile transmission device 100 of the present disclosure, a computer, and a control unit 210.

The tactile transmission device 100 of the present disclosure is already described in detail with reference to FIGS. 1 to 6B and thus is not described in detail here.

The computer is connected to the tactile transmission device 100 in a wired or wireless manner and is configured to associate the avatar with the motion of the finger.

In addition, if a predetermined contact occurs at the avatar, the control unit 210 enables the tactile transmission device 100 to contact the finger of the user and transmit the tactile feel thereto. The control unit 210 of the present disclosure may be a CPU of a wearable device such as a smart watch, and a battery of the smart watch may be used as a power source for supplying electric energy.

FIGS. 7A and 7B show an example where the control unit 210 is implemented to be worn on the wrist, but the present disclosure is not limited thereto.

Figure 8A:
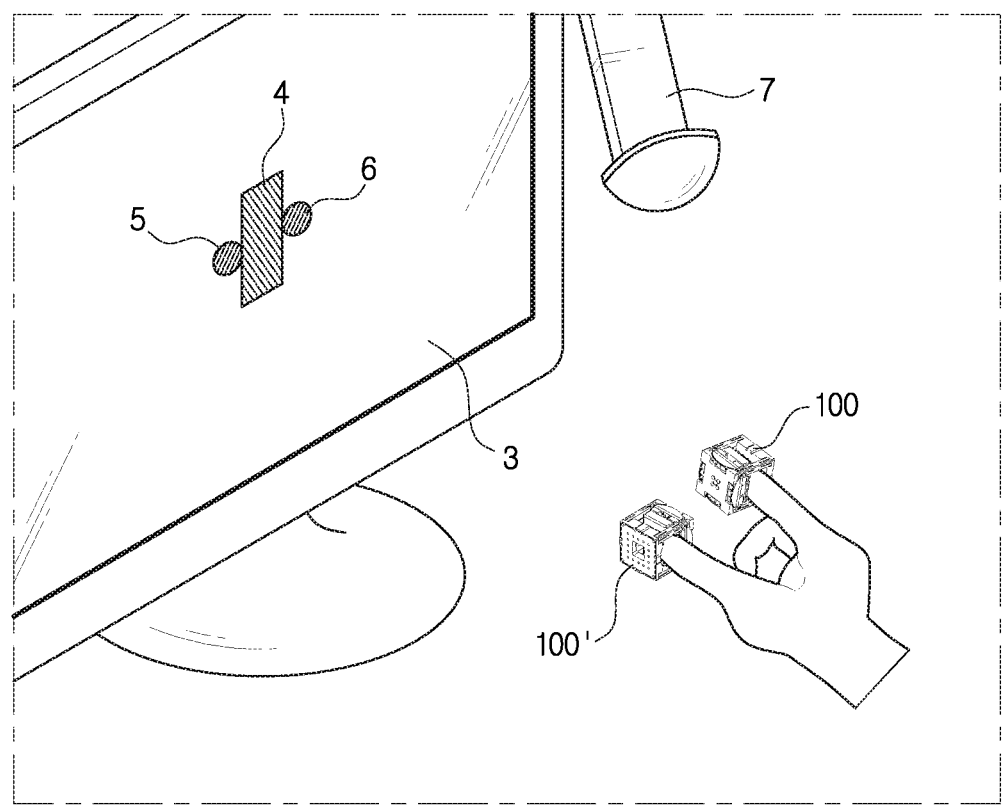
FIGS. 8A and 8B are diagrams conceptually showing operations of the user interface system of the present disclosure, respectively.
Figure 8B:
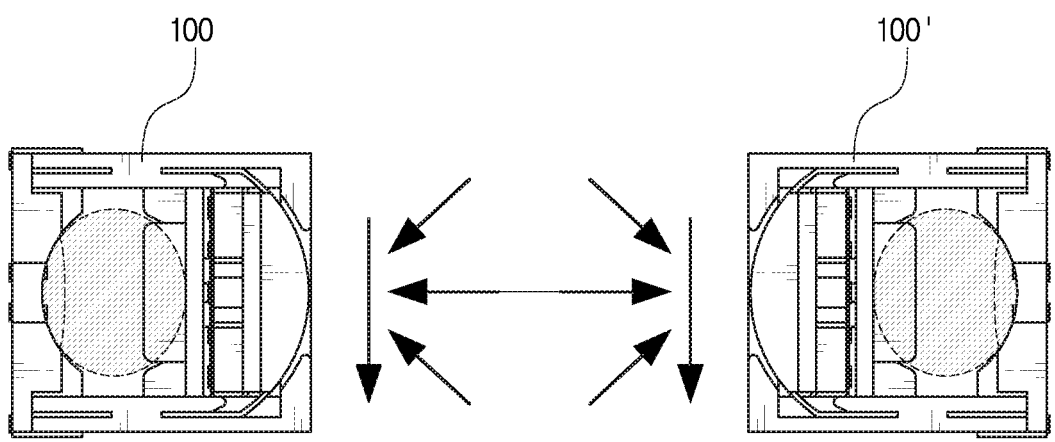

FIGS. 8A and 8B are diagrams conceptually showing operations of the user interface system 200 of the present disclosure, respectively.

As shown in FIG. 8A, two tactile transmission devices 100, 100' are worn on the fingers of the user, and graphics (avatars) 5, 6 operated by the respective fingers are displayed on a monitor 3. A computer (not shown) associates the graphics 5, 6 displayed on the monitor 3 with the motion of the finger of the user. Specifically, positions of two fingers (or two tactile transmission devices) are tracked by a finger location tracking device 7, and if the user moves the finger, two finger graphics 5, 6 move accordingly. The finger location tracking device 7 may be, for example, a sensor.

For example, if the user takes an action of bending the fingers to grip an object graphic 4 displayed on the monitor 3, two finger graphics 5, 6 approach the object graphic 4.

If two finger graphics 5, 6 come into contact with the object graphic 4, its signal is transmitted to the control unit 210 of the tactile transmission device, and the control unit 210 of the tactile transmission device 100 controls the tactile transmission device 100 to approach the fingers and transmit the tactile feel to the finger as shown in FIG. 8A.

If the user takes an action to grab the object graphic 4 with a stronger force, two tactile transmission devices 100, 100' press the fingers further so that the user may feel the corresponding pressure.

If the object graphic 4 vibrates, the contact portion reciprocates corresponding thereto to transmit vibration to the finger.

Meanwhile, the object graphic 4 of FIG. 8A may be set to have a predetermined weight.

In a case where the user lifts a cup filled with water as an example with the fingers, the user feels, at the finger skin, a pressure caused by the contact with the object and a shearing force generated since the skin is pressed downward due to the weight of the cup.

According to this embodiment, when if user moves the fingers to move two finger graphics 5, 6 upward in contact with the object graphic 4, as shown in FIG. 8B, the tactile feel is transmitted in the first and second directions by the tip-tilt elastic member, and the tactile feel is transmitted in the third direction by the surface elastic member. Thus, the user may feel the contact to the object and the weight of the object at the same time just by moving the fingers in the air.

The tactile transmission device of the present disclosure may achieve a high energy density by utilizing a shape memory alloy actuator, and may have a smaller and lighter design by utilizing a shape memory alloy actuator and a flexible device.

In addition, the tactile transmission device of the present disclosure may be easily worn and taken off, have good portability, and be implemented in a serial mechanism to allow easy control. Also, only necessary tactile feels may be selectively implemented.

According to the present disclosure, the user interface system operates a virtual graphic, but the present disclosure is not limited thereto.

The present disclosure may be used in various fields where it is necessary to transmit a sensation felt when gripping and manipulating an object in virtual reality and augmented reality, for example entertainment fields such as games and online shopping, sensory rehabilitation medical fields, and other fields such as education, travel, exhibition arts and expos.

In addition, the present disclosure may be effectively used in fields where it is necessary to precisely and accurately manipulate an object in a space that is difficult to access, for example remote works using an outer space exploration robot or a deep sea exploration robot.

Moreover, the present disclosure may be used to provide a user interface in next-generation computer fields in which human and computers commune with each other.

The device of the present disclosure may be stably worn even for fingers with different sizes to obtain a multi-degree of freedom force-feedback.

The device of the present disclosure is capable of receiving a multi-degree of freedom force-feedback with a small and light design. In particular, the multi-degree of freedom force-feedback of the present disclosure exhibits high energy density characteristics.

The present disclosure makes it possible to provide force-feedback of five degrees of freedom in total, including three degrees of freedom by the tip-tilt elastic member and two degrees of freedom by the surface elastic member.

The tactile transmission device 100 and the user interface system 200 including the same as described above are not limited to the configuration and method of the embodiments described above, but the embodiments may be modified in various ways by combining the embodiments entirely or selectively.

It will be apparent to those skilled in the art that the present disclosure can be embodied in other specific forms without departing from the essential characteristics of the present disclosure. Accordingly, the above detailed description should be considered in all respects as illustrative and not restrictive. The scope of the present disclosure shall be determined by rational interpretation of the appended claims, and all changes within the equivalence scope of the present disclosure shall fall within the scope of the present disclosure.

What is claimed is:
1. A tactile transmission device, comprising:
a base unit forming one surface of the tactile transmission device;
a tip-tilt elastic member stacked on the base unit and configured to transmit a tactile feel to a finger of a user in a first direction oriented upward from a bottom surface of the finger and a second direction intersecting the first direction at a predetermined angle; and a cover disposed at an upper side of the tip-tilt elastic member to form another surface of the tactile transmission device, wherein the tip-tilt elastic member includes:

a load support unit provided at a center portion of the tip-tilt elastic member and configured to support a load of the finger; and a pressing unit provided at an edge portion of the tip-tilt elastic member and configured to press in the first direction, wherein a first wire-type actuator is installed at the pressing unit, and when being elastically deformed, the first wire-type actuator presses the pressing unit to elastically deform the tip-tilt elastic member so that the tactile feel is transmitted to the finger in the first and second directions, and wherein guide pillars extending upward from the base unit to the cover are formed at four corners of the base unit, and the guide pillars have first guide grooves formed in a longitudinal direction to accommodate the first wire-type actuator.

2. The tactile transmission device according to claim 1, further comprising:

a surface elastic member stacked on the tip-tilt elastic member and configured to transmit the tactile feel in a third direction along which a shearing stress is transmitted to the finger.

3. The tactile transmission device according to claim 2, further comprising:

a contact portion disposed at an upper side of the surface elastic member to contact the finger of the user and transmit the tactile feel to the user.

4. The tactile transmission device according to claim 1, wherein the cover has a coupling hole formed so that an end portion of the first wire-type actuator is fixedly coupled therein, and wherein the cover has a second guide groove formed at an upper surface thereof to respectively communicate with the first guide groove and the coupling hole along an edge of the cover so that the first wire-type actuator is accommodated therein.

5. A user interface system for moving an avatar to correspond to a motion of a finger, comprising:

the tactile transmission device defined in claim 1;

a computer connected to the tactile transmission device in a wired or wireless manner and configured to associate the avatar with the motion of the finger; and a control processor configured to control the tactile transmission device to contact the finger of the user and transmit a tactile feel when a predetermined contact occurs at the avatar.

6. A tactile transmission device, comprising:

a base unit forming one surface of the tactile transmission device;

a tip-tilt elastic member stacked on the base unit and configured to transmit a tactile feel to a finger of a user in a first direction oriented upward from a bottom surface of the finger and a second direction intersecting the first direction at a predetermined angle;

a cover disposed at an upper side of the tip-tilt elastic member to form another surface of the tactile transmission device; and a surface elastic member stacked on the tip-tilt elastic member and configured to transmit the tactile feel in a third direction along which a shearing stress is transmitted to the finger, wherein the tip-tilt elastic member includes:

a load support unit provided at a center portion of the tip-tilt elastic member and configured to support a load of the finger; and a pressing unit provided at an edge portion of the tip-tilt elastic member and configured to press in the first direction, wherein a first wire-type actuator is installed at the pressing unit, and when being elastically deformed, the first wire-type actuator presses the pressing unit to elastically deform the tip-tilt elastic member so that the tactile feel is transmitted to the finger in the first and second directions, and wherein the surface elastic member includes:

a fixed portion provided at a side surface of the surface elastic member and fixed to the tip-tilt elastic member;

a movable portion configured to be movable in the third direction relative to the fixed portion; and a laterally elastic portion disposed between the fixed portion and the movable portion and elastically deformed to allow the movable portion to move in the third direction relative to the fixed portion.

7. The tactile transmission device according to claim 6, wherein the surface elastic member further includes a second wire-type actuator installed between the fixed portion and the movable portion and elastically deformed to change a relative position of the movable portion with respect to the fixed portion, so that the tactile feel is transmitted to the finger in the third direction.

8. The tactile transmission device according to claim 6, wherein the laterally elastic portion is provided in plural and is made of an elastic body disposed between a point contacting the fixed portion and a point contacting the movable portion.

9. The tactile transmission device according to claim 8, wherein the laterally elastic portion has a point-symmetric shape based on one point at a center of the movable portion.

10. A tactile transmission device, comprising:

a base unit forming one surface of the tactile transmission device;

a tip-tilt elastic member stacked on the base unit and configured to transmit a tactile feel to a finger of a user in a first direction oriented upward from a bottom surface of the finger and a second direction intersecting the first direction at a predetermined angle; and a cover disposed at an upper side of the tip-tilt elastic member to form another surface of the tactile transmission device, wherein the tip-tilt elastic member includes:

a load support unit provided at a center portion of the tip-tilt elastic member and configured to support a load of the finger; and a pressing unit provided at an edge portion of the tip-tilt elastic member and configured to press in the first direction, wherein a first wire-type actuator is installed at the pressing unit, and when being elastically deformed, the first wire-type actuator presses the pressing unit to elastically deform the tip-tilt elastic member so that the tactile feel is transmitted to the finger in the first and second directions, and wherein the tip-tilt elastic member further includes an elastic unit provided between the load support unit and the pressing unit to be elastically deformable, the elastic unit being configured to transmit the tactile feel to the finger in the first and second directions in a state where the pressing unit receives an upward force.

11. The tactile transmission device according to claim 10, wherein the load support unit includes a support protrusion protruding downward, wherein the pressing unit includes a pressing protrusion protruding downward and having a curved lower end, and wherein the base unit includes a pressing accommodation portion for accommodating and supporting the support protrusion and an inclined support portion having an inclined surface that contacts the pressing protrusion.

12. The tactile transmission device according to claim 10, wherein the pressing unit is respectively provided at four sides of the tip-tilt elastic member so that a force is transmittable to the pressing units at four sides in the first direction, and when the force is transmitted to at least one of the pressing units at four sides, the force transmitted to the finger is determined to be transmitted in the first direction or the second direction.

* * * * *